(12) United States Patent
Cai et al.

(10) Patent No.: US 9,319,536 B2
(45) Date of Patent: Apr. 19, 2016

(54) PROCESSING METHOD OF GATEWAY CHARGING AND GATEWAY

(71) Applicant: Huawei Technologies Co., Ltd., Shenzhen (CN)

(72) Inventors: Hui Cai, Shenzhen (CN); Shiyong Tan, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/581,888

(22) Filed: Dec. 23, 2014

(65) Prior Publication Data

US 2015/0111531 A1    Apr. 23, 2015

Related U.S. Application Data

(63) Continuation of application No. PCT/CN2012/077993, filed on Jun. 30, 2012.

(51) Int. Cl.
*H04M 11/00* (2006.01)
*H04M 15/00* (2006.01)
(Continued)

(52) U.S. Cl.
CPC ........... *H04M 15/66* (2013.01); *H04L 12/1403* (2013.01); *H04W 4/24* (2013.01)

(58) Field of Classification Search
CPC . H04L 12/14; H04L 12/1407; H04L 12/1403; H04W 4/24; H04W 88/16; H04M 15/66; H04M 15/00
See application file for complete search history.

(56) References Cited

U.S. PATENT DOCUMENTS

2007/0191033 A1* 8/2007 Marais .......................... 455/466
2009/0228954 A1* 9/2009 Hu et al. ............................ 726/1
(Continued)

FOREIGN PATENT DOCUMENTS

CN    101075886 A    11/2007
CN    101453722 A    6/2009
(Continued)

OTHER PUBLICATIONS

3rd Generation Partnership Project; Technical Specification Group Services and System Aspects; General Packet Radio Service (GPRS); Service description; Stage 2 (Release 11), 3GPP TS 23.060 V11.2.0 (Jun. 2012), 335 pages.

(Continued)

*Primary Examiner* — Ajit Patel
(74) *Attorney, Agent, or Firm* — Slater & Matsil, L.L.P.

(57) ABSTRACT

Embodiments of the present invention provide a processing method of gateway charging and a gateway, where a gateway is divided into two sub-gateways. The method includes, detecting, by a first sub-gateway, a current status of an access user if the first sub-gateway receives an online message, a newly establishing bearer message or a status change indication message of at least one access user. The method further includes sending, a first message to the second sub-gateway if the first sub-gateway determines that the at least one access user complies with a predefined rule of charging delayed reporting, where the first message indicates a charging policy corresponding to a current status of the at least one access user, and indicates, to the second sub-gateway, a delay of sending measured charging information, and receiving, charging information corresponding to all the statuses of the at least one access user that meets a reporting condition.

19 Claims, 3 Drawing Sheets

(51) Int. Cl.
    *H04L 12/14*     (2006.01)
    *H04W 4/24*      (2009.01)

(56) References Cited

U.S. PATENT DOCUMENTS

| | | | |
|---|---|---|---|
| 2012/0087319 A1* | 4/2012 | Raleigh et al. | 370/329 |
| 2012/0117251 A1 | 5/2012 | Zhou et al. | |
| 2012/0142311 A1 | 6/2012 | Rui et al. | |

FOREIGN PATENT DOCUMENTS

| | | |
|---|---|---|
| CN | 101730045 | 6/2010 |
| CN | 101877845 | 11/2010 |
| CN | 101998348 A | 3/2011 |
| CN | 102469433 | 5/2012 |
| WO | 2004036825 A1 | 4/2004 |
| WO | 2011011943 A1 | 2/2011 |

OTHER PUBLICATIONS

3rd Generation Partnership Project; Technical Specification Group Services and System Aspects; General Packet Radio Service (GPRS); Service description; Stage 2 (Release 11), 3GPP TS 23.060 V11.23.0 (Jun. 2012), 335 pages.

3rd Generation Partnership Project; Technical Specification Group Services and System Aspects; Telecommunication management; Charging management; Packet Switched (PS) domain charging (Release 11), 3GPP TS 32.251 V11.3.0 (Jun. 2012), 89 pages.

* cited by examiner

PROCESSING METHOD OF GATEWAY CHARGING AND GATEWAY

This application is a continuation of International Application No. PCT/CN2012/077993, filed on Jun. 30, 2012, which is hereby incorporated by reference in its entirety.

TECHNICAL FIELD

The present invention relates to the field of communications, and in particular, to a processing method of gateway charging and a gateway.

BACKGROUND

With the development of mobile Internet services, the richness of enterprise network services, and the convergence of mobile access networks of a variety of standards, a gateway is required to be developed towards a direction of more refined services control and charging on the basis of completion of basic data forwarding functions, so as to support implementation and control of richer services of an operator.

However, in the development of a gateway towards the direction of refined service control and charging, because adopted platforms are different, the development has different focuses. A general purpose computing platform is more suitable for processing control signaling such as mobility management and session management, so the development focuses on control processing of services. While a router platform formed by dedicated hardware has very strong performance in handling data forwarding on a user plane, which is generally more than ten times the capability of a general purpose computing platform, but this type of platform has weak performance in processing signaling. Therefore, in the prior art, if the development of a gateway focuses on improving a user data forwarding throughput, it is difficult to ensure the development towards the direction of more refined service control and charging. On the contrary, if the development of a gateway focuses on the development towards the direction of more refined service control and charging, it is difficult to ensure the improving of the user data forwarding throughput. Therefore, in the development of gateway charging, it is difficult to ensure both control and measurement charging, and there is a bottleneck in a processing method of charging.

SUMMARY

Embodiments of the present invention provide a processing method of gateway charging and a gateway, where the gateway is divided into two sub-gateways, so that an exchange frequency of information of the two sub-gateways is lowered, thereby reducing the load of processing of the gateway.

In order to achieve the objectives, embodiments of the present invention adopt the following technical solutions.

In an aspect, a processing method of gateway charging is provided, where a gateway is divided into a first sub-gateway and a second sub-gateway, the first sub-gateway is configured to process a charging policy and control the second sub-gateway, and the second sub-gateway is configured to forward data and collect charging information. The method includes detecting, by the first sub-gateway, a current status of at least one access user if the first sub-gateway receives a status change message of the at least one access user. The method further includes sending, by the first sub-gateway, a first message to the second sub-gateway if the first sub-gateway determines that the at least one access user complies with a predefined rule of charging delayed reporting, where the first message indicates a charging policy corresponding to the current status of the at least one access user, and indicates, to the second sub-gateway, a delay of sending measured charging information corresponding to all the statuses of the at least one access user, so that the second sub-gateway measures the charging information according to the charging policy and delays sending the charging information. The method further includes receiving, by the first sub-gateway, charging information corresponding to all the statuses of the at least one access user that meets a reporting condition and is sent by the second sub-gateway.

In an aspect, a processing method of gateway charging is provided, where a gateway is divided into a first sub-gateway and a second sub-gateway, the first sub-gateway is configured to process a charging policy and control the second sub-gateway, and the second sub-gateway is configured to forward data and collect charging information. The method includes receiving, by the second sub-gateway, a first message sent by the first sub-gateway. The method further comprises respectively measuring charging information corresponding to a current status of the at least one access user according to a charging policy corresponding to the current status of the at least one access user, if the first message received by the second sub-gateway indicates the charging policy corresponding to the current status of the at least one access user, and indicating a delay of sending measured charging information corresponding to all the statuses of the at least one access user. The method further comprises sending, by the second sub-gateway, the charging information corresponding to all the statuses of the at least one access user to the first sub-gateway if the second sub-gateway determines that the charging information corresponding to all the statuses of the at least one access user meets a reporting condition.

In an aspect, a gateway is provided, where the gateway is divided into a first sub-gateway and a second sub-gateway, the first sub-gateway is configured to process a charging policy and control the second sub-gateway, and the second sub-gateway is configured to forward data and collect charging information. The first sub-gateway includes a processing unit, configured to detect a current status of at least one access user if the first receiving unit receives an online message, a newly establishing bearer message or a status change indication message of the at least one access user. The first sub-gateway further includes a sending unit, configured to send a first message to the second sub-gateway if the processing unit determines that the at least one access user complies with a predefined rule of charging delayed reporting, where the first message indicates a charging policy corresponding to the current status of the at least one access user, and indicates, to the second sub-gateway, a delay of sending measured charging information corresponding to all the statuses of the at least one access user, so that the second sub-gateway measures the charging information according to the charging policy and delays sending the charging information. The first sub-gateway further includes a second receiving unit, configured to receive charging information corresponding to all the statuses of the at least one access user that meets a reporting condition and is sent by the second sub-gateway.

In an aspect, a gateway is provided, where the gateway is divided into a first sub-gateway and a second sub-gateway, the first sub-gateway is configured to process a charging policy and control the second sub-gateway, and the second sub-gateway is configured to forward data and collect charging information. The second sub-gateway includes a receiving unit, configured to receive a first message sent by the first sub-gateway. The second sub-gateway further includes a measurement unit, configured to respectively measure charging information corresponding to a current status of at least one access user according to a charging policy corresponding to the current status of the at least one access user, if the first message received by the receiving unit indicates a charging policy corresponding to the current status of the at least one access user, and indicates a delay of sending measured charging information corresponding to all the statuses of the at least one access user. The second sub-gateway further includes a sending unit, configured to send the first sub-gateway the charging information corresponding to all the statuses of the at least one access user measured by the measurement unit, if the processing unit determines that the charging information corresponding to all the statuses of the at least one access user meets a reporting condition.

According to the processing method of gateway charging and the gateway provided by the embodiments of the present invention, the gateway is divided into a first sub-gateway and a second sub-gateway. The first sub-gateway detects a current status if the first sub-gateway receives a status change message of at least one access user. The first sub-gateway delays sending the second sub-gateway a first message that indicates a charging policy of an access user and reporting charging information, if the first sub-gateway determines that the at least one access user complies with a predefined rule of charging delayed reporting, so that the second sub-gateway measures the charging information according to the charging policy and delays sending the measured charging information. The first sub-gateway receives the charging information sent by the second sub-gateway. In this manner, because the first sub-gateway may indicate, to the second sub-gateway, a delay of sending the charging information of an access user having a not high real-time quality of charging, and the second sub-gateway sends the first sub-gateway the charging information only after a preset reporting condition is met, but does not send charging information corresponding to each status in real time after measuring the charging information. Therefore, frequencies for sending data information between the two sub-gateways are reduced, thereby avoiding transmission of a great amount of measurement data at a high frequency, and reducing the load of processing of the gateway.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF ILLUSTRATIVE EMBODIMENTS

The technical solutions in the embodiments of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
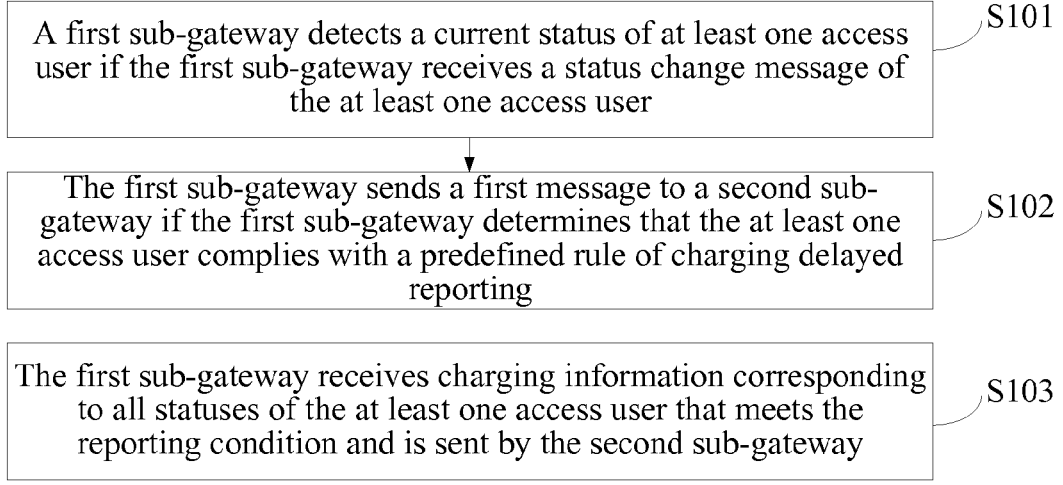
FIG. 1 is a schematic flow chart of a processing method of charging on a first sub-gateway in a gateway provided by an embodiment of the present invention.

According to a processing method of gateway charging provided by an embodiment of the present invention, a gateway is divided into a first sub-gateway and a second sub-gateway, the first sub-gateway is configured to process a charging policy and control the second sub-gateway, and the second sub-gateway is configured to forward data and collect charging information. As shown in FIG. 1, the method is a method for a first sub-gateway side, and the method includes the following steps:

S101: The first sub-gateway detects a current status of at least one access user if the first sub-gateway receives a status change message of the at least one access user.

For example, the status change message may be an online message of an access user, a newly establishing bearer message or a status change indication message of the access user.

It should be noted that, the first sub-gateway is mainly configured to complete user access, policy control and charging ticket management and control the second sub-gateway, and the first sub-gateway may use a general purpose computing platform to perform control processing of control signaling such as mobility management and session management. The second sub-gateway is mainly configured to forward data and execute the control signaling or other messages sent by the first sub-gateway, and the second sub-gateway may use a router platform formed by dedicated hardware. In this way, the gateway is divided into two sub-gateways to respectively perform control and data management without restrictions in the prior art that the development of a gateway is focused on refined service control and charging or is focused on data forwarding throughput, so that the gateway can be developed towards the direction of refined service control and charging, and at the same, can increase the data forwarding throughput.

For example, if an access user A and an access user B go online or newly establishes a bearer, the first sub-gateway detects a current status of the access user A and a current status of the access user B. An access user generally uses a default bearer when going online, but when the access user has other demands and the default bearer cannot meet the demands of the access user, the access user newly establishes a dedicated bearer. Or, both the statuses of the access user A and the access user B are changed, for example, the Qos (Quality of Service, quality of service) of the access user A is improved, while the Qos of the access user B is decreased. If a base station detects that the Qos of the access user A and the Qos of the access user B are changed, the base station sends an indication message to the first sub-gateway to indicate that the current Qos of the access user A and the current Qos of the access user B are changed, the first sub-gateway detects the current status (that is, the current Qos) of the access user A and the current status of the access user B, so as to obtain the current Qos and the improved Qos of the access user A and the current Qos and the decreased Qos of the access user B.

S102: The first sub-gateway sends a first message to the second sub-gateway if the first sub-gateway determines that the at least one access user complies with a predefined rule of charging delayed reporting.

The first message indicates a charging policy corresponding to the current status of the at least one access user, and indicates, to the second sub-gateway, a delay of sending measured charging information corresponding to all the statuses of the at least one access user, so that the second sub-gateway measures the charging information corresponding to all the statuses of the at least one access user according to the charging policy and delays sending the charging information corresponding to all the statuses of the at least one access user.

Preferably, if the first sub-gateway determines that both the access user A and the access user B are subscribers, for example, the access user A is a call monthly package user, and subscription information is 500-min fee local calling, and the access user B is a traffic monthly package user, and subscription information is 80-M free traffic per month, the first sub-gateway determines that the access user A meets a call charging delayed reporting condition in a predefined rule of charging delayed reporting, and determines that the access user B meets an Internet charging delayed reporting condition in a predefined rule of charging delayed reporting, the first sub-gateway sends a first message to the second sub-gateway, where the first message indicates a charging policy corresponding to the current status of the access user A and indicates, to the second sub-gateway, a delay of sending charging information measured according to the charging policy of the access user A, and at the same time, the first message further indicates a charging policy corresponding to the current status of the access user B and indicates, to the second sub-gateway, a delay of sending charging information measured according to the charging policy of the access user B.

For example, the first sub-gateway may also send two first messages, where one first message indicates the charging policy corresponding to the current status of the access user A and indicates, to the second sub-gateway, a delay of sending the charging information measured according to the charging policy of the access user A; the other first message indicates the charging policy corresponding to the current status of the access user B and indicates, to the second sub-gateway, a delay of sending the charging information measured according to the charging policy of the access user B.

It should be noted that, after the second sub-gateway receives the first message, the second sub-gateway measures the charging information according to the charging policy of the access user A and the charging policy of the access user B, for example, measures a call duration of the access user A and Internet time of the access user B, and saves the call duration of the access user A in the current status and the Internet time of the access user B in the current status. When the call duration of the access user A in the current status or the Internet time of the access user B in the current status meets the reporting condition, for example, the left monthly free call time of the access user A is 200 min, when the call duration of the access user A in the current status reaches 200 min, the second sub-gateway sends the measured charging information corresponding to the current status of the access user A to the first sub-gateway.

S103: The first sub-gateway receives the charging information corresponding to all the statuses of the at least one access user that meet the reporting condition and is sent by the second sub-gateway.

For example, the second sub-gateway measures charging information of each access user, for example, measures that a call duration of the access user A in a status of poor Qos is 100 min, or a call duration of the access user A with the access user B is another 400 min after the access user A and the access user B are switched to a status of good Qos, while the reporting condition of the access user A is to send the first sub-gateway the charging information when the call duration reaches 500 min, and the second sub-gateway does not send the charging information to the first sub-gateway when the second sub-gateway measures that the call duration of the access user A in the status of poor Qos is 100 min, and the second sub-gateway sends the first sub-gateway that the call duration of the access user A in the status of poor Qos is 100 min and the call duration in the status of good Qos is 400 min when the second sub-gateway measures that the call duration after the access user A and the access user B are switched to the status of good Qos is another 400 min. Or, if the call duration of the access user A in the current status is only 350 min, because 100 min+350 min<500 min, the second sub-gateway delays sending the first sub-gateway the charging information, and then, if a call duration of the access user A in a status of common Qos is 80 min, when the call duration of the access user A in the status of common Qos is 50 min, the second sub-gateway sends the first sub-gateway that the call duration of the access user A in the status of poor Qos is 100 min, the call duration in the status of good Qos is 350 min, and the call duration in the status of common Qos is 50 min. Herein, merely a situation that the access user A starts calling in the status of poor Qos and the Qos is charged is taken as an example for illustration, all status changes of an access user caused by changes of other conditions fall with the protection scope.

According to the processing method of gateway charging provided by the embodiment of the present invention, a gateway is divided into a first sub-gateway and the second sub-gateway. The first sub-gateway detects a current status if the first sub-gateway receives a status change message of at least one access user, and sends the second sub-gateway a first message that indicates a charging policy of an access user and a delay of reporting charging information, if the first sub-gateway determines that the at least one access user complies with a predefined rule of charging delayed reporting, so that the second sub-gateway measures the charging information according to the charging policy and delays sending the measured charging information. The first sub-gateway receives the charging information sent by the second sub-gateway. In this manner, because the first sub-gateway may indicate, to the second sub-gateway, a delay of sending the charging information of an access user having a not high real-time quality of charging, and the second sub-gateway sends the charging information to the first sub-gateway only after a preset reporting condition is met, but does not send charging information corresponding to each status in real time after measuring the charging information. Therefore, frequencies for sending data information between the two sub-gateways are reduced, thereby avoiding transmission of a great amount of measurement data at a high frequency, and reducing the load of processing of the gateway.

Figure 2:
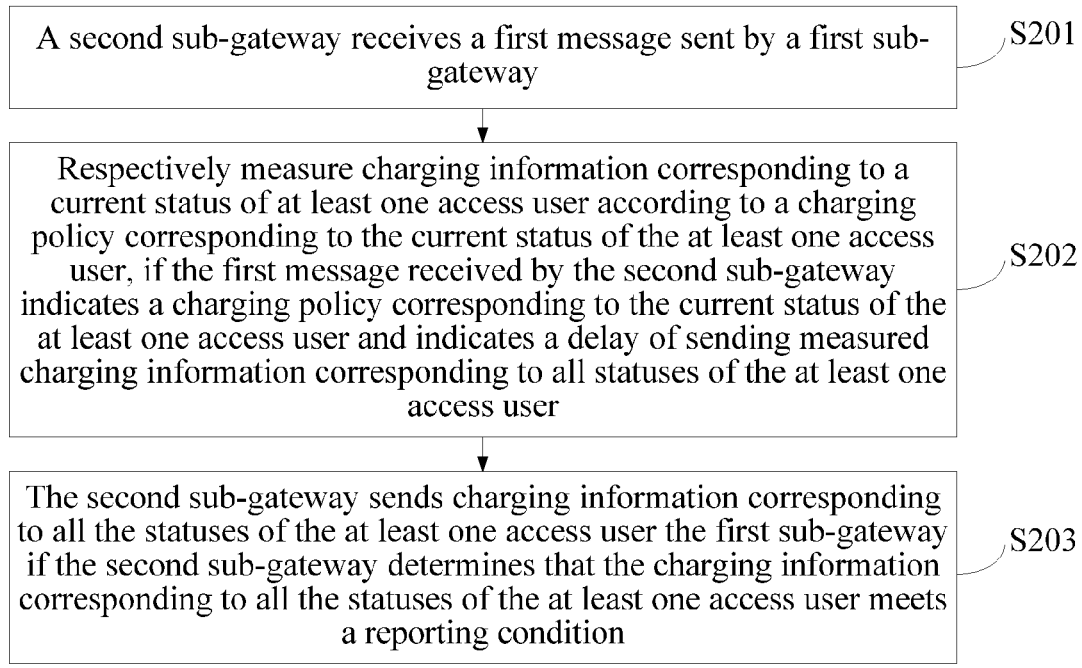
FIG. 2 is a schematic flow chart of a processing method of charging on a second sub-gateway in a gateway provided by an embodiment of the present invention.

According to a gateway charging method provided by an embodiment of the present invention, a gateway is divided into a first sub-gateway and a second sub-gateway, the first sub-gateway is configured to process a charging policy and control the second sub-gateway, and the second sub-gateway is configured to forward data and collect charging information. As shown in FIG. 2, the method is a method for a second sub-gateway side, and the method includes the following steps:

S201: The second sub-gateway receives a first message sent by the first sub-gateway.

S202: Respectively measure charging information corresponding to a current status of at least one access user according to a charging policy corresponding to the current status of the at least one access user, if the first message received by the second sub-gateway indicates a charging policy corresponding to the current status of the at least one access user and indicates a delay of sending measured charging information corresponding to all the statuses of the at least one access user.

For example, if the first message received by the second sub-gateway indicates a charging policy corresponding to a current status of an access user A and indicates, to the second sub-gateway, a delay of sending charging information measured according to the charging policy of the access user A, and at the same time, the first message further indicates a charging policy corresponding to a current status of an access user B and indicates, to the second sub-gateway, a delay of sending charging information measured according to the charging policy of the access user B; or, the second sub-gateway receives two first messages, where one first message indicates a charging policy corresponding to a current status of an access user A and indicates, to the second sub-gateway, a delay of sending the information measured according to the charging policy of the access user A; the other first message indicates a charging policy corresponding to a current status of an access user B and indicates, to the second sub-gateway, a delay of sending charging information measured according to the charging policy of the access user B, the second sub-gateway respectively measures the charging information of the access user A according to the charging policy corresponding to the current status of the access user A, and measures the charging information of the access user B according to the charging policy corresponding to the current status of the access user B.

S203: The second sub-gateway sends charging information corresponding to all the statuses of the at least one access user to the first sub-gateway if the second sub-gateway determines that the charging information corresponding to all the statuses of the at least one access user meets a reporting condition.

It should be noted that, the second sub-gateway respectively measures the charging information of the at least one access user, may preset the reporting condition for all access users as a call duration of 100 min or the traffic of 30 M, or the like, and may also set the reporting condition for each type of subscriber according to subscription information. For example, the reporting condition for an access user with call monthly package of 500 min is set as a call duration of 100 min or 250 min. In this embodiment, a situation that the reporting condition for a user is set as a call duration of 100 min and the traffic of 30 M is taken as an example for illustration, which is not intended to limit the present invention.

For example, if the second sub-gateway determines whether a measured call duration of the access user A meets the reporting condition and whether measured Internet time of the access user B meets the reporting condition, for example, the reporting condition is a call duration of 100 min and the traffic of 30 M, when the call duration of the access user A is 400 min, the second sub-gateway sends charging information corresponding to a current status for one time when the call duration of the access user A reaches 100 min, and sends charging information corresponding to a current status for one time when the call duration of the access user A reaches 200 min, and so on, till the call of the access user A ends. The Internet traffic of the access user B is 19 M, and does not meet the reporting condition of the traffic of 30 M, and in a previous status of the current status, the access user B also uses the traffic of 4 M, because a sum of the traffic used by the access user B in the two statuses does not meet the reporting condition of the traffic of 30 M, the second sub-gateway may save the charging information measured in the two statuses, that is, save a traffic value corresponding to each status. If the charging policy for measuring the traffic of the access user B is received again, the second sub-gateway continuously measures the traffic of the access user B. If the access user B uses the traffic of 20 M this time, when the access user uses the traffic of 7 M, the traffic of the access user B meets the reporting condition, and the second sub-gateway sends the first sub-gateway the traffic of the access user B in all statuses and the traffic corresponding to all the statuses.

According to the processing method of gateway charging provided by the embodiment of the present invention, a gateway is divided into a first sub-gateway and the second sub-gateway. The first sub-gateway detects a current status if the first sub-gateway receives a status change message of at least one access user, and sends the second sub-gateway a first message that indicates a charging policy of an access user and a delay of reporting charging information, if the first sub-gateway determines that the at least one access user complies with a predefined rule of charging delayed reporting, so that the second sub-gateway measures the charging information according to the charging policy and delays sending the measured charging information. The first sub-gateway receives the charging information sent by the second sub-gateway. In this manner, because the first sub-gateway may indicate, to the second sub-gateway, a delay of sending the charging information of an access user having a not high real-time quality of charging, and the second sub-gateway sends the first sub-gateway the charging information only after a preset reporting condition is met, but does not send charging information corresponding to each status in real time after measuring the charging information. Therefore, frequencies for sending data information between the two sub-gateways are reduced, thereby avoiding transmission of a great amount of measurement data at a high frequency, and reducing the load of processing of the gateway.

Figure 3:
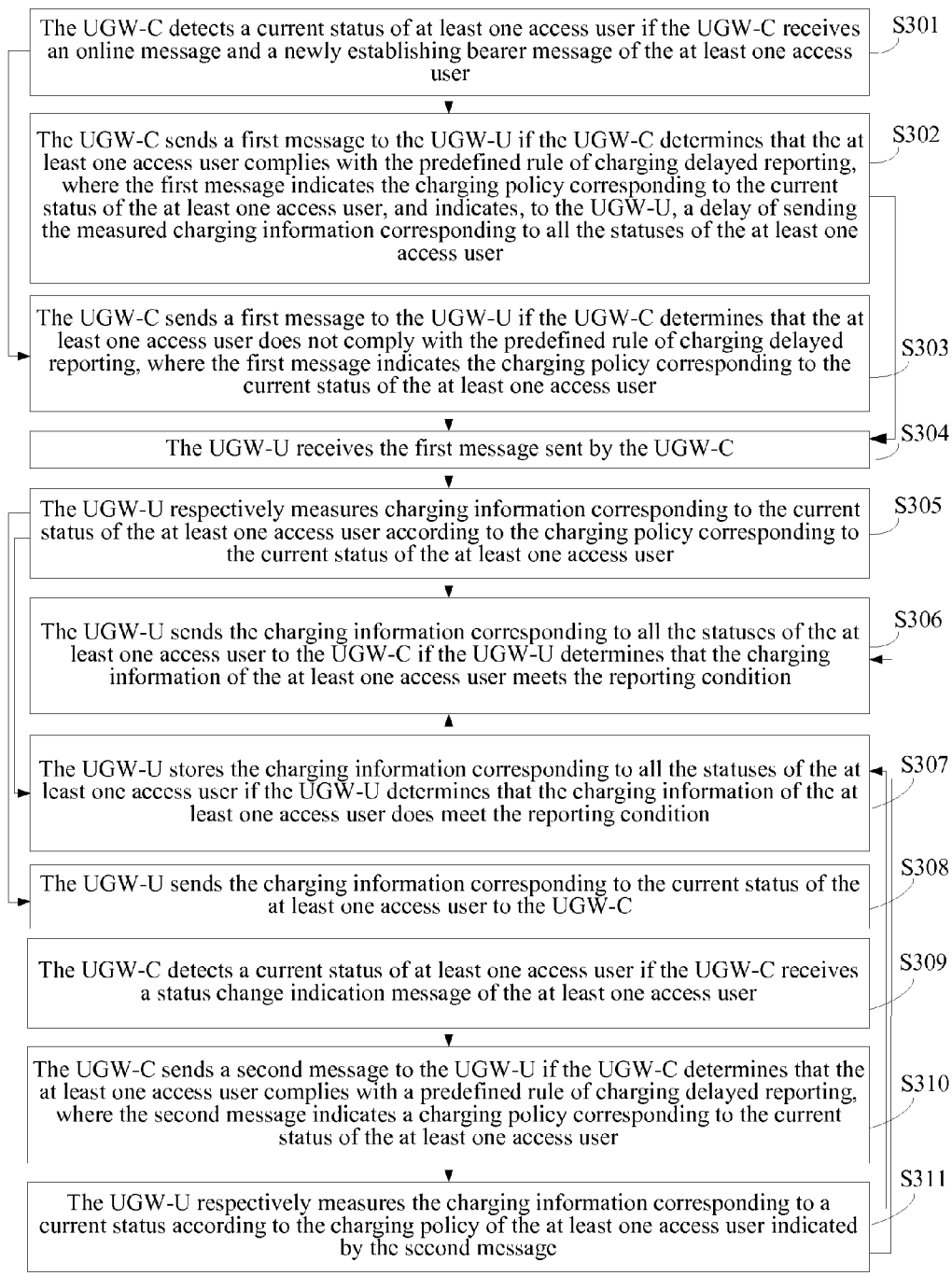
FIG. 3 is a schematic flow chart of a processing method of gateway charging provided by an embodiment of the present invention.

According to a processing method of gateway charging provided by another embodiment of the present invention, as shown in FIG. 3, in this embodiment, a situation that a gateway is a UGW (Unified Gateway, unified gateway), a first sub-gateway is a UGW-C (Unified Gateway Control plane, unified gateway control plane), and a second sub-gateway is a UGW-U (Unified Gateway User plane, unified gateway user plane) is taken as an example, which is not intended to limit the present invention. Other gateways such as a PGW (Packet Data Network Gateway, packet data gateway), a SGW (Serving Gateway, serving gateway), a PDSN (Packet Data Serving Node, packet data serving node) or a WASN (Wireless Access Service Network, wireless access service network) that can be divided into a control plane and a user plane, that is, a forwarding plane, all fall within the protection scope. The method includes the following steps:

S301: The UGW-C detects a current status of at least one access user if the UGW-C receives an online message or a newly establishing bearer message of the at least one access user.

It should be noted that, if the UGW-C obtains an access message of an access user A, that is, the access user A goes online, the UGW-C determines that the access user A uses a default bearer. In some specific conditions, for example, in a condition that the Qos is poor, an access user B wants to watch a video, but the default bearer cannot meet the request of the access user B for watching a video, so a new dedicated bearer needs to be established, where the bandwidth of the dedicated bearer can meet the request of the access user B for watching a video on the Internet.

Further, in this embodiment, merely an online message or a newly establishing bearer message of an access user are taken as an example for illustration, but the following situation also fall within the protection scope. If the UGW-C receives a status change indication message of at least one access user, such as the access user A, and the access user A does not comply with the predefined rule of charging delayed reporting previously, after this status is changed, the UGW-C detects the current status of the access user A, and determines that the access user A complies with the predefined rule of charging delayed reporting, and then, the UGW-C sends a first message to the UGW-U to indicate a charging policy corresponding to the current status of the access user A and indicate, to the UGW-U, a delay of sending measured charging information corresponding to all the statuses of the access user A, and details are not described herein again.

S302: The UGW-C sends a first message to the UGW-U if the UGW-C determines that the at least one access user complies with the predefined rule of charging delayed reporting, where the first message indicates the charging policy corresponding to the current status of the at least one access user, and indicates, to the UGW-U, a delay of sending the measured charging information corresponding to all the statuses of the at least one access user.

For example, if the UGW-C determines that both the access user A and the access user B are subscribers, for example, the access user A is a call monthly package user, and subscription information is 500-min fee local calling, and the access user B is a traffic monthly package user, and subscription information is 80-M free traffic per month, the UGW-C determines that both the access user A and the access user B comply with the predefined rule of charging delayed reporting, and sends a first message to the UGW-U, where the first message respectively indicates charging policies corresponding to the current statuses of the access user A and the access user B, and indicates, to the second sub-gateway, a delay of sending the charging information measured according to the charging policy of the access user A.

Further, if the UGW-C sends the UGW-U a control policy that indicates an access user or an access user bearer, the control policy may carry the first message, so as to reduce the amount of information sent between the UGW-C and UGW-U.

It should be noted that, the first message may be an identifier corresponding to a charging policy mutually agreed by the UGW-C and the UGW-U and an identifier indicating a delay, so as to reduce transmission channels occupied by a message.

S303: The UGW-C sends a first message to the UGW-U if the UGW-C determines that the at least one access user does not comply with the predefined rule of charging delayed reporting, where the first message indicates the charging policy corresponding to the current status of the at least one access user.

For example, if the UGW-C determines that both an access user C and an access user D are not subscribers, the UGW-C determines that both the access user C and the access user D do not comply with the predefined rule of charging delayed reporting, and sends a first message to the UGW-U, where the first message respectively indicates charging polices corresponding to current statuses of the access user C and the access user D, so that the UGW-U immediately returns charging information after measuring the charging information according to the charging policies.

It should be noted that, the predefined rule of charging delayed reporting is set by the UGW-C according to a pre-configured delayed reporting policy known to the UGW-C and the UGW-U; or the predefined rule of charging delayed reporting is set by the UGW-C according to a delayed reporting policy delivered by a policy controller; or the predefined rule of charging delayed reporting is set by the UGW-C according to a delayed reporting policy delivered by a charging system.

S304: The UGW-U receives the first message sent by the UGW-C.

It should be noted that, if the first message that is sent by the UGW-C and received by the UGW-U indicates the charging policy corresponding to the current status of the at least one access user, and indicates, to the UGW-U, a delay of sending the measured charging information corresponding to all the statuses of the at least one access user, step S306 or step S307 is performed after step S305 is performed; if the first message that is sent by the UGW-C and received by the UGW-U indicates the charging policy corresponding to the current status of the at least one access user, step S308 is perform after step S305 is performed.

S305: The UGW-U respectively measures charging information corresponding to the current status of the at least one access user according to the charging policy corresponding to the current status of the at least one access user.

For example, the UGW-U respectively performs measurement according to the charging policies corresponding the current statuses of the access user A, the access user B, the access user C and the access user D, for example, the measurement result is that the call duration of the access user A is 100 min, the Internet traffic of the access user B is 5 M, the call duration of the access user C is 20 min, and the Internet traffic of the access user D is 3 M.

S306: The UGW-U sends the charging information corresponding to all the statuses of the at least one access user to the UGW-C if the UGW-U determines that the charging information of the at least one access user meets the reporting condition.

For example, if the reporting condition is a call duration of 100 min, when the call duration of the access user A reaches 100 min, the UGW-U sends the call duration 100 min of the access user A to the UGW-C.

S307: The UGW-U stores the charging information corresponding to all the statuses of the at least one access user if the UGW-U determines that the charging information of the at least one access user does meet the reporting condition.

For example, if the reporting condition is the traffic of 80 M, the UGW-U stores that the Internet traffic of the access user B is 5 M, and does not send the Internet traffic 5 M of the access user B to the UGW-C, but sends the Internet traffic 5 M of the access user B to the UGW-C when the Internet traffic of the access user B measured by the UGW-U is added up to 80 M.

S308: The UGW-U sends the charging information corresponding to the current status of the at least one access user to the UGW-C.

For example, the UGW-U sends the call duration 20 min of the access user C and the Internet traffic 3 M of the access user D to the UGW-C. If the UGW-U completes measurement of the access user C and the access user D at the same time, the UGW-U may send the call duration 20 min of the access user C and the Internet traffic 3 M of the access user D to the UGW-C by means of one piece of information, or may respectively send two pieces of information, where each piece of information carries charging information of one access user, for example, a first piece of information carries the call duration 20 min of the access user C, and the other piece of information carries the Internet traffic 3 M of the access user D.

S309: The UGW-C detects a current status of at least one access user if the UGW-C receives a status change indication message of the at least one access user.

It should be noted that, the UGW-C may determine that a charging policy of an access user is changed according to the received status change indication message. For example, if the UGW-C determines, according to the received status change indication message that the status of the access user B is changed when the Internet traffic used by the access user B reaches 3 M, the UGW-C detects the status when the access user B uses the traffic of 3 M, that is, the current status.

S310: The UGW-C sends a second message to the UGW-U if the UGW-C determines that the at least one access user complies with a predefined rule of charging delayed reporting, where the second message indicates a charging policy corresponding to the current status of the at least one access user.

It should be noted that, the bearer access message or the newly establishing bearer message of the access user B has triggered the first message, and the first message has indicated, to the UGW-U, a delay of reporting information of the access user B, and therefore, in the status is switched, the second message may not indicate a delay of reporting, but the present invention is not limited thereto, and the second message may also indicate, to the UGW-U, a delay of sending the measured charging information corresponding to all the statuses of the access user B.

Further, the second message may be an identifier corresponding to a charging policy mutually agreed by the UGW-C and the UGW-U, so as to reduce transmission channels occupied by a message.

S311: The UGW-U respectively measures the charging information corresponding to a current status according to the charging policy of the at least one access user indicated by the second message.

For example, the UGW-U measures that the access user B uses the traffic of 90 M for browsing videos according to the charging policy of the access user B indicated by the second message.

It should be noted that, the UGW-U performs step S306 or step S307 according to a measurement result.

For example, the access user B uses the traffic of 90 M for browsing videos, because a previous measurement result shows that the access user B has used the traffic of 3 M, when the access user B uses 77 M for browsing videos, the reporting condition is met, that is, the access user B uses the traffic of 80 M, the UGW-U performs step S306, and after the UGW-U sends the traffic of 80 M, the UGW-U may continuously measure the left traffic of 3 M, and then performs step S307.

According to the processing method of gateway charging provided by the embodiment of the present invention, a gateway is divided into a UGW-C and a UGW-U. The UGW-C detects a current status, if the UGW-C receives a status change message of at least one access user, and sends the UGW-U a first message that indicates a charging policy of an access user and a delay of reporting charging information, if the UGW-C determines that the at least one access user complies with a predefined rule of charging delayed reporting, so that the UGW-U measures the charging information according to the charging policy and delays sending the measured charging information. The UGW-C receives the charging information sent by the second sub-gateway. In this manner, because the UGW-C may indicate, to the UGW-U, a delay of sending the charging information of an access user having a not high real-time quality of charging, and the UGW-U sends the UGW-C the charging information after a preset reporting condition is met, but does not send charging information corresponding to each status in real time after measuring the charging information. Therefore, frequencies for sending data information between the two sub-gateways are reduced, thereby avoiding transmission of a great amount of measurement data at a high frequency, and reducing the load of processing of the gateway.

Figure 4:
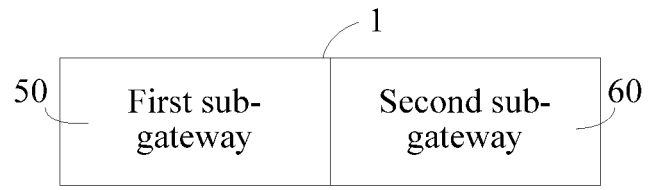
FIG. 4 is a schematic structural diagram of a gateway provided by an embodiment of the present invention.
Figure 5:
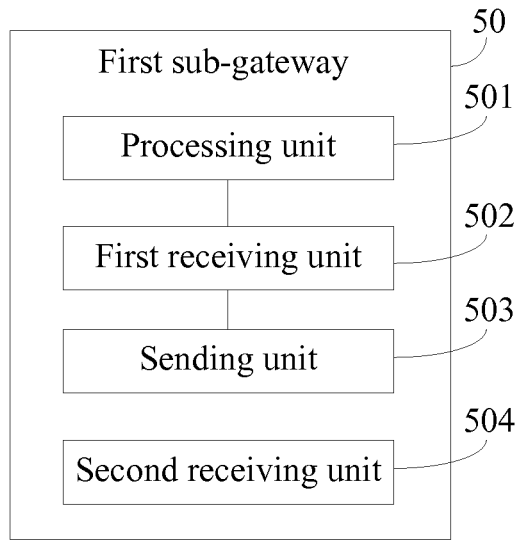
FIG. 5 is a schematic structural diagram of a first sub-gateway provided by an embodiment of the present invention.

According to a gateway 1 provided by an embodiment of the present invention, as shown in FIG. 4, the gateway 1 includes a first sub-gateway 50 for processing a charging policy and controlling a second sub-gateway 60 and the second sub-gateway 60 for forwarding data and collecting charging information. As shown in FIG. 5, the first sub-gateway 50 includes a processing unit 501, configured to detect a current status of at least one access user if a first receiving unit 502 receives a status change message of the at least one access user, such as an online message, a newly establishing bearer message or a status change indication message. The first sub-gateway 50 further includes a sending unit 503, configured to send a first message to the second sub-gateway 60 if the processing unit 502 determines that the at least one access user complies with a predefined rule of charging delayed reporting, where the first message indicates a charging policy corresponding to the current status of the at least one access user and indicates, to the second sub-gateway 60, a delay of sending measured charging information corresponding to all statuses of the at least one access user, so that the second sub-gateway 60 measures charging information according to the charging policy and delays sending the charging information. The first sub-gateway 50 further includes a second receiving unit 504, configured to receive charging information corresponding to all the statuses of the at least one access user that meets a reporting condition and is sent by the second sub-gateway 60.

For example, the second receiving unit 504 may receive charging information corresponding to all statuses of a first access user of the at least one access user sent by the second sub-gateway 60, where the charging information is sent when a sum of the charging information corresponding to all the statuses of the first access user measured by the second sub-gateway 60 reaches or exceeds a preset threshold.

Further, the sending unit 503 is further configured to send a first message to the second sub-gateway 60 if the processing unit 502 determines that the at least one access user does not comply with the predefined rule of charging delayed reporting, where the first message indicates the charging policy corresponding to the current status of the at least one access user, so that the second sub-gateway 60 measures the charging information according to the charging policy and sends the charging information. In this manner, the charging information received by the second receiving unit 504 is the charging information corresponding to the current status of the at least one access user sent by the second sub-gateway 60.

It should be noted that, the processing unit 503 is further configured to: after the sending unit 503 sends the first message to the second sub-gateway 60, detect the current status of the at least one access user if the first receiving unit 501 receives a status change message of the at least one access user, and send a second message to the second sub-gateway 60 if the access user complies with the predefined rule of charging delayed reporting and the first message indicating a delay has been sent through the sending unit 503, where the second message indicates the charging policy corresponding to the current status of the at least one access user, so that the second sub-gateway 60 measures the charging information according to the charging policy and delays sending the charging information according to the first message.

This first sub-gateway 50 may adopt the methods provided by the foregoing embodiments to work, and the working method is the same as the methods provided by the embodiments, so details are not described herein again.

Figure 6:
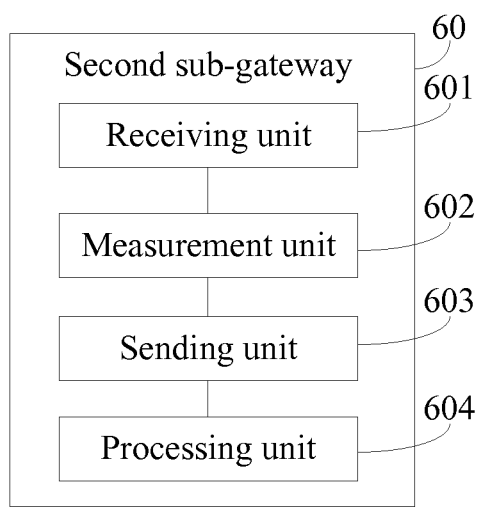
FIG. 6 is a schematic structural diagram of a second sub-gateway provided by an embodiment of the present invention.

As shown in FIG. 6, the second sub-gateway 60 includes a receiving unit 601, configured to receive the first message sent by the first sub-gateway 50. The second sub-gateway 60 further includes a measurement unit 602, configured to respectively measure the charging information corresponding to the current status of the at least one access user according to a charging policy corresponding to the current status of the at least one access user, if the first message received by the receiving unit 601 indicates the charging policy corresponding to the current status of the at least one access user and indicates a delay of sending the measured charging information corresponding to all the statuses of the at least one access user. The second sub-gateway 60 further includes a sending unit 603, configured to send the first sub-gateway 50 the charging information corresponding to all the statuses of the at least one access user measured by the measurement unit 602, if the processing unit 604 determines that the charging information corresponding to all the statuses of the at least one access user meets the reporting condition.

For example, the sending unit 603 may send the charging information corresponding to all the statuses of the first access user to the first sub-gateway 50 when the processing unit 604 determines that a sum of the charging information corresponding to all the statuses of the first access user in the least one access user reaches or exceeds a preset threshold of the first access user.

Or, the measurement unit 602 is configured to respectively measure the charging information corresponding to the current status of the at least one access user according to the charging policy corresponding to the current status of the at least one access user when the first message received by the receiving unit 601 indicates the charging policy corresponding to the current status of the at least one access user. In this case, the sending unit 603 may send the charging information corresponding to the current status of the at least one access user measured by the measurement unit 602 to the first sub-gateway 50 in time.

It should be noted that, if the receiving unit 601 in the second sub-gateway 60 has received the first message of the at least one access user, for example, an access user A, and the first message indicates a delay of sending charging information of the access user A, when the receiving unit 601 receives the second message sent by the first sub-gateway 50, and the second message merely indicates the charging policy corresponding to the current status of the at least one access user, the measurement unit 602 measures the charging information corresponding to a current status of the access user A according to the charging policy, but the sending unit 603 sends the first sub-gateway 50 the charging information corresponding to all the statuses of the access user A measured by the measurement unit 602, only when the processing unit 604 determines that charging information corresponding to all the statuses of the access user A meets the reporting condition; otherwise, the second sub-gateway stores the measurement result, and the sending unit 603 sends the first sub-gateway 50 the charging information corresponding to all the statuses of the access user A measured by the measurement unit 602, till the processing unit 604 determines that the charging information corresponding to all the statuses of the access user A meets the reporting condition.

The second sub-gateway 60 may adopt the methods provided by the foregoing embodiments to work, and the working method is the same as the methods provided by the embodiments, so details are not described herein again.

According to the gateway provided by the embodiment of the present invention, the gateway is divided into a first sub-gateway and the second sub-gateway. The first sub-gateway detects a current status if the first sub-gateway receives a status change message of at least one access user, and sends the second sub-gateway a first message that indicates a charging policy of an access user and a delay of reporting charging information, if the first sub-gateway determines that the at least one access user complies with a predefined rule of charging delayed reporting, so that the second sub-gateway measures the charging information according to the charging policy and delays sending the measured charging information. The first sub-gateway receives the charging information sent by the second sub-gateway. In this manner, because the first sub-gateway may indicate, to the second sub-gateway, a delay of sending the charging information of an access user having a not high real-time quality of charging, and the second sub-gateway sends the first sub-gateway the charging information only after a preset reporting condition is met, but does not send charging information corresponding to each status in real time after measuring the charging information. Therefore, frequencies for sending data information between the two sub-gateways are reduced, thereby avoiding transmission of a great amount of measurement data at a high frequency, and reducing the load of processing of the gateway.

The foregoing descriptions are merely specific embodiments of the present invention, but not intended to limit the present invention. Any variation or replacement made by persons skilled in the art in the technical scope disclosed by the present invention shall fall within the protection scope of the present invention. Therefore, the protection scope of the present invention is subject to the appended claims.

What is claimed is:

1. A processing method of gateway charging, wherein a gateway is divided into a first sub-gateway and a second sub-gateway, the first sub-gateway is configured to process a charging policy and control the second sub-gateway, and the second sub-gateway is configured to forward data and collect charging information, the method comprising:

detecting, by the first sub-gateway, a current status of at least one access user if the first sub-gateway receives a status change message of the at least one access user;

sending, by the first sub-gateway, a first message to the second sub-gateway if the first sub-gateway determines that the at least one access user complies with a predefined rule of charging delayed reporting, wherein the first message indicates a charging policy corresponding to the current status of the at least one access user, and indicates, to the second sub-gateway, a delay of sending measured charging information corresponding to all the statuses of the at least one access user, so that the second sub-gateway measures the charging information according to the charging policy and delays sending the charging information; and receiving, by the first sub-gateway, the charging information corresponding to all the statuses of the at least one access user that meets a reporting condition and is sent by the second sub-gateway.

2. The method according to claim 1, after detecting, by the first sub-gateway, the current status of the at least one access user, further comprising:

sending, by the first sub-gateway, a first message to the second sub-gateway if the first sub-gateway determines that the at least one access user does not comply with the predefined rule of charging delayed reporting, wherein the first message indicates the charging policy corresponding to the current status of the at least one access user, so that the second sub-gateway measures the charging information according to the charging policy and sends the charging information; and receiving, by the first sub-gateway, charging information corresponding to the current status of the at least one access user sent by the second sub-gateway.

3. The method according to claim 1, wherein receiving, by the first sub-gateway, the charging information corresponding to all the statuses of the at least one access user comprises:

receiving, by the first sub-gateway, charging information corresponding to all statuses of a first access user of the at least one access user sent by the second sub-gateway, wherein the charging information is sent when a sum of the charging information corresponding to all the statuses of the first access user measured by the second sub-gateway reaches or exceeds a preset threshold.

4. The method according to claim 1, after sending, by the first sub-gateway, the first message to the second sub-gateway, further comprising:

detecting, by the first sub-gateway, a current status of the at least one access user if the first sub-gateway receives a status change message of the at least one access user; and sending, by the first sub-gateway, a second message to the second sub-gateway if the first sub-gateway determines that the at least one access user complies with the predefined rule of charging delayed reporting, wherein the second message indicates the charging policy corresponding to the current status of the at least one access user, so that the second sub-gateway measures the charging information according to the charging policy and delays sending the charging information according to the first message.

5. The method according to claim 1, wherein the predefined rule of chargin delayed reporting is set by the first sub-gateway according to a pre-configured delayed reporting policy known to the first sub-gateway and the second sub-gateway.

6. The method according to claim 1, wherein the predefined rule of charging delayed reporting is set by the first sub-gateway according to a delayed reporting policy delivered by a policy controller.

7. The method according to claim 1, wherein the predefined rule of charging delayed reporting is set by the first sub-gateway according to a delayed reporting policy delivered by charging system.

8. A processing method of gateway charging, wherein a gateway is divided into a first sub-gateway and a second sub-gateway, the first sub-gateway is configured to process a charging policy and control the second sub-gateway, and the second sub-gateway is configured to forward data and collect charging information, the method comprising:

receiving, by the second sub-gateway, a first message sent by the first sub-gateway;

respectively measuring charging information corresponding to a current status of the at least one access user according to a charging policy corresponding to the current status of the at least one access user, if the first message received by the second sub-gateway indicates the charging policy corresponding to the current status of the at least one access user and indicates a delay of sending measured charging information corresponding to all statuses of the at least one access user; and sending, by the second sub-gateway, the charging information corresponding to all the statuses of the at least one access user to the first sub-gateway if the second sub-gateway determines that the charging information corresponding to all the statuses of the at least one access user meets a reporting condition.

9. The method according to claim 8, after receiving, by the second sub-gateway, a first message sent by the first sub-gateway, further comprising:

respectively measuring charging information corresponding to the current status of at least one access user according to the charging policy corresponding to the current status of the at least one access user, if the first message received by the second sub-gateway indicates the charging policy corresponding to the current status of the at least one access user; and sending, by the second sub-gateway, the charging information corresponding to the current status of the at least one access user to the first sub-gateway.

10. The method according to claim 8, wherein sending, by the second sub-gateway, the charging information corresponding to all the statuses of the at least one access user to the first sub-gateway comprises:

sending, by the second sub-gateway, charging information corresponding to all statuses of a first access user to the first sub-gateway if the second sub-gateway determines that a sum of the charging information corresponding to all the statuses of the first access user reaches or exceeds a preset threshold.

11. The method according to claim 8, before sending, by the second sub-gateway, the charging information corresponding to all the statuses of the at least one access user to the first sub-gateway, further comprising:

receiving, by the second sub-gateway, a second message sent by the first sub-gateway, wherein the second message indicates the charging policy corresponding to the current status of the at least one access user; and respectively measuring, by the second sub-gateway, charging information corresponding to the current status of the at least one access user according to the charging policy.

12. A gateway, wherein the gateway is divided into a first sub-gateway and a second sub-gateway, the first sub-gateway is configured to process a charging policy and control the second sub-gateway, the second sub-gateway is configured to forward data and collect charging information, and the first sub-gateway comprises:

a processor; and a non-transitory computer-readable storage medium storing a program to be executed by the processor, the program including instructions for:

detecting a current status of at least one access user, if the first sub-gateway receives a status change message of the at least one access user;

sending a first message to the second sub-gateway if the first sub-gateway determines that the at least one access user complies with a predefined rule of charging delayed reporting, wherein the first message indicates a charging policy corresponding to the current status of the at least one access user, and indicates, to the second sub-gateway, a delay of sending measured charging information corresponding to all the statuses of the at least one access user, so that the second sub-gateway measures the charging information according to the charging policy and delays sending the charging information; and receiving charging information corresponding to all the statuses of the at least one access user that meets a reporting condition and is sent by the second sub-gateway.

13. The gateway according to claim 12, wherein the program further includes instructions for:
　　sending a first message to the second sub-gateway if the first sub-gateway determines that the at least one access user does not comply with the predefined rule of charging delayed reporting, wherein the first message indicates the charging policy corresponding to the current status of the at least one access user, so that the second sub-gateway measures the charging information according to the charging policy and sends the charging information; and
　　receiving charging information corresponding to the current status of the at least one access user sent by the second sub-gateway.

14. The gateway according to claim 12, wherein the program further includes instructions for:
　　receiving charging information corresponding to all statuses of a first access user of the at least one access user sent by the second sub-gateway, wherein the charging information is sent when a sum of the charging information corresponding to all the statuses of the first access user measured by the second sub-gateway reaches or exceeds a preset threshold.

15. The gateway according to claim 12, wherein the program further includes instructions for:
　　after the sending the first message to the second sub-gateway, detecting a current status of the at least one access user if the first sub-gateway receives the status change message of the at least one access user; and
　　sending a second message to the second sub-gateway if the first sub-gateway determines that the at least one access user complies with the predefined rule of charging delayed reporting, wherein the second message indicates the charging policy corresponding to the current status of the at least one access user, so that the second sub-gateway measures the charging information according to the charging policy and delays sending the charging information according to the first message.

16. A gateway, wherein the gateway is divided into a first sub-gateway and a second sub-gateway, the first sub-gateway is configured to process a charging policy and control the second sub-gateway, the second sub-gateway is configured to forward data and collect charging information, and the second sub-gateway comprises:
　　a processor; and
　　a non-transitory computer-readable storage medium storing a program to be executed by the processor, the program including instructions for:
　　　　receiving a first message sent by the first sub-gateway;
　　　　respectively measuring charging information corresponding to a current status of at least one access user according to a charging policy corresponding to the current status of the at least one access user, if the first message received by the second sub-gateway indicates a charging policy corresponding to the current status of the at least one access user, and indicates a delay of sending measured charging information corresponding to all statuses of the at least one access user; and
　　　　sending the first sub-gateway the charging information corresponding to all the statuses of the at least one access user, if the second sub-gateway determines that the charging information corresponding to all the statuses of the at least one access user meets a reporting condition.

17. The gateway according to claim 16, wherein the program further includes instructions for:
　　respectively measuring the charging information corresponding to the current status of the at least one access user according to the charging policy corresponding to the current status of the at least one access user if the first message received by the second sub-gateway indicates the charging policy corresponding to the current status of the at least one access user; and
　　sending the charging information corresponding to the current status of the at least one access user measured by the second sub-gateway to the first sub-gateway.

18. The gateway according to claim 16, wherein the program further includes instructions for:
　　sending the first sub-gateway the charging information corresponding to all the statuses of the first access user if the second sub-gateway determines that a sum of charging information corresponding to all statuses of a first access user of the at least one access user reaches or exceeds a preset threshold of the first access user.

19. The gateway according to claim 16, wherein the program further includes instructions for:
　　receiving a second message sent by the first sub-gateway, wherein the second message indicates the charging policy corresponding to the current status of the at least one access user; and
　　respectively measuring charging information corresponding to the current status of the at least one access user by the second sub-gateway according to the charging policy.

\* \* \* \* \*

UNITED STATES PATENT AND TRADEMARK OFFICE
CERTIFICATE OF CORRECTION

PATENT NO.      : 9,319,536 B2                                  Page 1 of 1
APPLICATION NO. : 14/581888
DATED           : April 19, 2016
INVENTOR(S)     : Cai et al.

It is certified that error appears in the above-identified patent and that said Letters Patent is hereby corrected as shown below:

In the Claims

In Col. 15, line 36, claim 5, delete "chargin" and insert --charging--.

Signed and Sealed this
Second Day of August, 2016

Michelle K. Lee
*Director of the United States Patent and Trademark Office*